(12) United States Patent
Onishi et al.

(10) Patent No.: US 7,075,672 B2
(45) Date of Patent: Jul. 11, 2006

(54) PRINT DATA MANAGEMENT APPARATUS, STORAGE MEDIUM HAVING STORED THEREIN PRINT DATA MANAGEMENT PROGRAM, STORAGE MEDIUM HAVING STORED THEREIN USAGE CERTIFICATE DATA, AND METHOD OF USING PRINT DATA

(75) Inventors: Joji Onishi, Suwa (JP); Mikio Aoki, Suwa (JP); Shinya Taniguchi, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 911 days.

(21) Appl. No.: 09/877,210

(22) Filed: Jun. 11, 2001

(65) Prior Publication Data

US 2002/0015185 A1 Feb. 7, 2002

(30) Foreign Application Priority Data

Jun. 9, 2000 (JP) .............................. 2000-173555

(51) Int. Cl.
  *G06F 3/12* (2006.01)
  *G06F 15/00* (2006.01)
  *G96K 1/00* (2006.01)
(52) U.S. Cl. ..................... 358/1.15; 358/1.16; 380/51; 380/54; 342/5.2
(58) Field of Classification Search ............... 358/1.16, 358/1.15; 340/5.2; 380/51, 54
See application file for complete search history.

(56) References Cited

U.S. PATENT DOCUMENTS

| 5,673,373 | A  | * | 9/1997  | Nosaki et al. ............. 358/1.15 |
| 5,805,804 | A  |   | 9/1998  | Laursen et al. |
| 6,226,618 | B1 |   | 5/2001  | Downs et al. |
| 6,314,521 | B1 | * | 11/2001 | Debry ...................... 713/201 |
| 6,385,728 | B1 | * | 5/2002  | DeBry ...................... 713/201 |
| 6,862,103 | B1 | * | 3/2005  | Miura et al. ............... 358/1.15 |

FOREIGN PATENT DOCUMENTS

| EP | 0 860 986 A2 | 8/1998 |
| JP | A-10-177554 | 6/1998 |
| JP | A-11-146118 | 5/1999 |
| JP | A-11-194903 | 7/1999 |

(Continued)

OTHER PUBLICATIONS

U.S. Appl. No. 09/876,055, filed Jun. 8, 2001, Onishi et al.

*Primary Examiner*—Edward Coles
*Assistant Examiner*—Yixing Qin
(74) *Attorney, Agent, or Firm*—Oliff & Berridge, PLC

(57) ABSTRACT

The invention provides a print data management apparatus which can use print data advantageously in terms of data capacity. A database server performs a registration process and a providing process. When a data registration request is received from a shop, the registration process registers receipt data included in the received data registration request in association with data name information, password information, and the like. At the same time, the registration process transmits usage certificate data which includes the information and to a buyer. When a data usage request is received from a print server, and when a password of a record in which the same data name as that included in the received data usage request is registered matches a password included in the received data usage request, the providing process transmits receipt data specified by the data name included in the received data usage request to the print server.

13 Claims, 7 Drawing Sheets

FOREIGN PATENT DOCUMENTS

| | | |
|---|---|---|
| JP | A-11-225155 | 8/1999 |
| JP | A-11-237969 | 8/1999 |
| JP | A-11-338933 | 12/1999 |
| JP | A-2000-30154 | 1/2000 |
| JP | A-2000-030154 | 1/2000 |

* cited by examiner

110 USAGE CERTIFICATE DATA REGISTRATION TABLE

| DATA NAME | PASSWORD | USAGE COUNT | EXPIRATION DATE |
|---|---|---|---|
| RECEIPT DATA 1 | xxxxabcd | 1 | 2000/3/31 |
| RECEIPT DATA 2 | yyyybcde | 1 | 2000/4/30 |
| ≈ | ≈ | ≈ | ≈ |
| RECEIPT DATA n | zzzzcdef | 1 | 2000/5/31 |

PRINT DATA MANAGEMENT APPARATUS, STORAGE MEDIUM HAVING STORED THEREIN PRINT DATA MANAGEMENT PROGRAM, STORAGE MEDIUM HAVING STORED THEREIN USAGE CERTIFICATE DATA, AND METHOD OF USING PRINT DATA

BACKGROUND OF THE INVENTION

1. Field of Invention

The present invention relates to apparatuses, storage media, and methods for using print data by computer systems, and more specifically, relates to a print data management apparatus which can use print data advantageously in terms of data capacity, a storage medium having stored therein a print data management program, a storage medium having stored therein usage certificate data, and a method of using print data.

2. Description of Related Art

Typically, when a buyer purchases an item at a store, a receipt, which is a detailed statement of the item, is issued to the buyer.

Various information that is supplied as printed matter can be converted into data. In accordance with the needs of users, the data is printed for use. Concerning receipts, instead of immediately issuing a receipt as printed matter, the receipt is converted into data, and, for example, the receipt data can be subsequently used in accounting or the like. As a result, the buyer cannot possibly lose the receipt. Also, the management of the receipt does not become complex, which is very convenient.

On the other hand, in recent years, it has been possible to use various data by using portable terminals, such as cellular phones and the like. An example of this is i-mode offered by NTT Communications Network, Inc. (NTT DoCoMo). When receipts are converted into data and the receipt data is used by a portable terminal, the receipt data is stored in the portable terminal. The number of receipts that can be stored in the portable terminal is limited since it is difficult to install a large-capacity memory in the portable terminal, due to issues of cost reduction and size.

A similar problem may be experienced not only with receipts but also with other printed matter.

SUMMARY OF THE INVENTION

In view of the unsolved problems encountered with such conventional techniques, it is an object of the present invention to provide a print data management apparatus capable of using print data while being advantageous in terms of data capacity, a storage medium having stored therein a print data management program, a storage medium having stored therein usage certificate data, and a method of using print data.

In order to achieve the foregoing objects, the print data management apparatus of the present invention registers, in response to a data registration request which includes print data, the print data and provides, in response to a data usage request, the print data relating to the data usage request. The print data management apparatus includes a storage device that performs registration of the print data; a registration device that registers the print data in the storage device; and a providing device that provides the print data in the storage device. When the data registration request is received, the registration device registers the print data included in the received data registration request in the storage device, in association with authentication information for authenticating whether or not a user is eligible to use the print data, and the registration device transmits usage certificate data that includes the authentication information. When the data usage request that includes the authentication information is received, and when the authentication information in the storage device that corresponds to the print data relating to the received data usage request and the authentication information included in the received data usage request satisfy a predetermined relationship, the providing device transmits the print data in the storage device relating to the received data usage request.

With this arrangement, for example, when a user wants to use print data provided by a provider, the provider first transmits a data registration request including print data to the print data management apparatus.

When the data registration request is received, the print data management apparatus uses the registration device to register the print data included in the received data registration request in the storage device, in association with authentication information for authenticating whether or not the user is eligible to use the print data. Also, usage certificate data including the authentication information is transmitted. Then, the user receives the transmitted usage certificate data and obtains the authentication information.

Next, the user refers to the authentication information included in the usage certificate information and transmits a data usage request including the authentication information to the print data management apparatus.

When the data usage request is received, and when the authentication information in the storage device that corresponds to the print data relating to the received data usage request and the authentication information included in the received data usage request satisfy a predetermined relationship, the print data management apparatus uses the providing device to transmit the print data in the storage device relating to the received data usage request. The transmitted print data is printed by a printer or other device at the destination.

By storing the usage certificate including the authentication information, instead of the print data itself, in the user's terminal, the user can print the print data at any location, if necessary.

In the storage device, print data is registered by every method on every occasion. Alternatively, it is possible to register the print data beforehand in the storage device. Also, without registering the print data in advance, it is possible to register the print data in response to an external input or the like when the apparatus is operating.

For example, a predetermined relationship is said to be satisfied when authentication information for a checked object matches authentication information for a checking object, when the result of a calculation according to a predetermined arithmetic expression based on authentication information for a checked object matches the authentication information for a checking object, or when the result of a calculation according to a predetermined arithmetic expression based on authentication information for the checked object matches the result of a calculation using a predetermined arithmetic expression based on authentication information for the checking object. Hereinafter the same applies to a storage medium having stored therein a print data management program and to a method of using print data.

As long as the registration device is designed to directly or indirectly transmit usage certificate data to a user, the registration device can be of any structure. For example, usage certificate data can be directly transmitted to the user by transmitting the usage certificate data to a user's terminal. Also, the usage certificate data can be transmitted to a provider's terminal, and then the provider's terminal transmits the data to the user's terminal. In this way, the usage certificate data is indirectly transmitted to the user. Hereinafter the same applies to a storage medium having stored therein the print data management program and the method of using print data.

As long as the providing device is designed to transmit print data, the providing device can be of any structure. For example, any providing device can be used as long as it directly or indirectly transmits the print data to a user or a print terminal. When directly or indirectly transmitting print data to a user or a print terminal, the procedure is similar to that described in the example of the registration device. Hereinafter the same applies to a storage medium having stored therein the print data management program and to the method of using print data.

The print data management apparatus according to the present invention can be formed of one terminal or a set of functions of terminals. For example, when the print data management apparatus includes a set of functions of two terminals, the structure is as follows. Specifically, one terminal includes a storage device and a providing device, and the other terminal includes a registration device that registers print data in the storage device of one terminal.

In the print data management apparatus of an aspect of the present invention, the registration device registers the print data included in the received data registration request in the storage device, in association with usage count information which indicates the number of times the print data is permitted to be used. When a usage count in the usage count information in the storage device that corresponds to the print data relating to the received data usage request is greater than or equal to a predetermined number, the providing device transmits the print data in the storage device relating to the received data usage request to a print terminal, and, when the usage count in the usage count information is less than the predetermined number, transmission of the print data is prohibited.

With this arrangement, when a data registration request is received, the registration device registers the print data included in the received data registration request in the storage device, in association with usage count information indicating the number of times the print data is permitted to be used.

In contrast, when a data usage request is received, and when a usage count in the usage count information in the storage device that corresponds to the print data relating to the received data usage request is greater than or equal to a predetermined number, the providing device transmits the print data in the storage device relating to the received data usage request to a print terminal. The transmitted print data is printed by the print terminal. In contrast, when the usage count in the usage count information in the storage device that corresponds to the print data relating to the received data usage request is less than the predetermined number, transmission of the print data is prohibited.

Thus, the provider can restrict the number of times the user can use the print data. Since the print data is directly transmitted to the print terminal, it is difficult for the user to freely duplicate the print data.

In the print data management apparatus of another aspect of the present invention, the usage certificate data further includes a network address that uniquely specifies the location of the apparatus on a network to which the apparatus is connected.

With this arrangement, the registration device transmits usage certificate data that includes not only authentication information but also a network address that uniquely specifies the location of the print data management apparatus on the network to which the print data management apparatus is connected. The user receives the transmitted usage certificate data and obtains the authentication information and the network address.

By referring to the network address included in the usage certificate data, the user can transmit a data usage request including the authentication information to the print data management apparatus.

In the print data management apparatus of another aspect of the present invention, the usage certificate data further includes a network address that uniquely specifies, on a network, the storage location of a program that transmits the data usage request which includes the authentication information to the apparatus, the program being stored in the network.

With this arrangement, the registration device transmits usage certificate data which includes not only authentication information but also a network address that uniquely specifies, on the network, the storage location of a program that transmits a data usage request including the authentication information to the print data management apparatus, the program being stored in the network. The user receives the transmitted usage certificate data and obtains the authentication information and the network address.

By referring to the network address included in the usage certificate data, the user reads the program from a network terminal. Using the program, the user can transmit a data usage request including the authentication information to the print data management apparatus.

The program stored in the network is a program stored in a network resource connected to the network. For example, the program can be stored in a terminal that establishes a connection through the network with another terminal that tries to use usage data based on the usage certificate data. Also, the program can be stored in a terminal that attempts to use usage data based on the usage certificate data. Hereinafter the same applies to a storage medium having stored therein usage certificate data.

In the print data management apparatus of another aspect of the present invention, when a network address is included in the data registration request, the registration device transmits the usage certificate data to a destination specified by the network address, and, when no network address is included in the data registration request, the registration device transmits the usage certificate data to the sender of the data registration request.

With this arrangement, when a network address is included in a data registration request, the registration device transmits usage certificate data to a destination specified by the network address. In contrast, when no network address is included in a data registration request, the registration device transmits usage certificate data to the sender of the data registration request.

In a print data management apparatus of another aspect of the present invention, when a network address is included in the data usage request, the providing device transmits the print data to a destination specified by the network address, and, when no network address is included in the data usage request, the providing device transmits the print data to the sender of the data usage request.

With this arrangement, when a network address is included in a data usage request, the providing device transmits print data to a destination specified by the network address. In contrast, when no network address is included in a data usage request, the providing device transmits print data to the sender of the data usage request.

In order to achieve the foregoing objects, a storage medium having stored therein the print data management program of the present invention includes a computer-readable storage medium having stored therein a print data management program to be applied to the print data management apparatus discussed above. The storage medium stores a program for causing the computer to perform processing implemented by a registration device that registers print data in the storage device and processing implemented by the providing device that provides the print data in the storage device. When a data registration request is received, the registration device registers the print data included in the received data registration request in the storage device, in association with authentication information that authenticates whether or not a user is eligible to use the print data, and the registration device transmits usage certificate data which includes the authentication information. When a data usage request which includes the authentication information is received, and when the authentication information in the storage device which corresponds to the print data relating to the received data usage request and the authentication information included in the received data usage request satisfy a predetermined relationship, the providing device transmits the print data in the storage device relating to the received data usage request.

With this arrangement, the program stored in the storage medium is read by the computer. When the computer performs processing in accordance with the read program, operations equivalent to those of the print data management apparatus of the invention can be obtained.

In order to achieve the foregoing objects, the storage medium having stored therein usage certificate data of the present invention includes a computer-readable storage medium having stored therein usage certificate data to be transmitted by a print data management apparatus discussed above. The storage medium stores authentication information for authenticating, by the print data management apparatus, whether or not a user is eligible to use the print data and a network address that uniquely specifies, on a network, the storage location of a program for transmitting a data usage request that includes the authentication information to the print data management apparatus, the program being stored in the network.

With this arrangement, data stored in the storage medium is read by the computer. When the computer performs processing based on the read data, the computer refers to the network address included in the read usage certificate data and reads the program. Using the read program, the computer transmits a data usage request including the authentication information to the print data management apparatus.

In order to achieve the foregoing objects, a method of using print data of the present invention uses print data by a computer system. The method with regard to a provider for providing the print data includes registering the print data in a storage device in association with authentication information for authenticating whether or not a user is eligible to use the print data; and transmitting usage certificate information which includes the authentication information to the user of the print data. The method with regard to the user includes receiving the usage certificate data; and transmitting a data usage request which includes the authentication information. The method with regard to the provider includes receiving the data usage request; and transmitting the print data in the storage device relating to the received data usage request to a print terminal when the authentication information in the storage device which corresponds to the print data relating to the received data usage request and the authentication information included in the received data usage request satisfy a predetermined relationship.

In the method of using print data of the present invention according to the method of using print data, the provider further performs registering the print data in the storage device in association with usage count information which indicates the number of times the print data is permitted to be used; and transmitting, when a usage count in the usage count information in the storage device that corresponds to the print data relating to the received data usage request is greater than or equal to a predetermined number, the print data in the storage device relating to the received data usage request to a print terminal, and prohibiting transmission of the print data when the usage count in said usage count information is less than the predetermined number.

DETAILED DESCRIPTION OF PREFERRED EMBODIMENTS

Embodiments of the present invention will now be described with reference to the drawings. FIGS. 1 to 11 illustrate a print data management apparatus, a storage medium having stored therein a print data management program, a storage medium having stored therein usage certificate data, and a method of using print data according to embodiments of the present invention.

Figure 1:
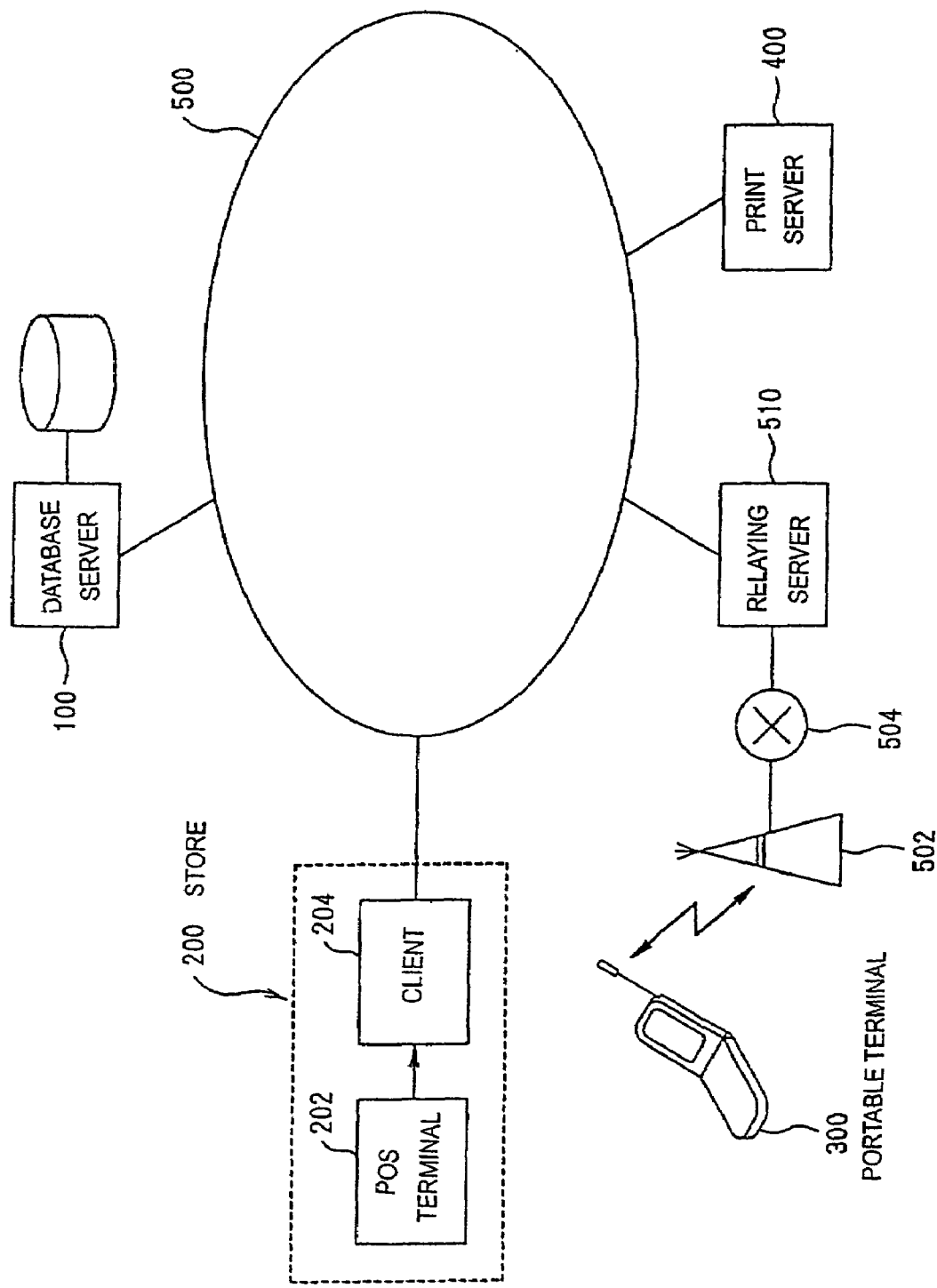
FIG. 1 is a schematic of the configuration of a network system to which the present invention is applied.

In this embodiment, the print data management apparatus, the storage medium having stored therein the print data management program, the storage medium having stored therein the usage certificate data, and the method of using print data according to the present invention are applied to the following case. As shown in FIG. 1, when a buyer purchases an item at a store 200, receipt data that is a detailed statement of the item is registered in a database server 100. Instead of the receipt data, usage certificate data that uses the receipt data is issued to the buyer. Subsequently, the buyer can use the usage certificate data to print the receipt data.

The configuration of a network system to which the present invention is applied will now be described with reference to FIG. 1. FIG. 1 is a schematic of the configuration of the network system to which the present invention is applied.

As shown in FIG. 1, the database server 100 that registers and provides receipt data, a client 204 installed at the store 200, a relaying server 510 that relays communication between a portable terminal 300 owned by the buyer and a network 500, and a print server 400 that prints receipt data are connected to the network 500.

A POS (Point Of Sale) terminal 202 that transmits receipt data, which is a detailed statement of an item, to the client 204 is connected to the client 204. In the POS terminal 202, when a particular item is sold, and when an item code that identifies the item is input using a barcode reader or the like, the name and price of the item which correspond to the input item code are read from a database or the like. The information and certificate information which certifies that it has been issued by the store 200 are generated as receipt data. The generated receipt data is transmitted to the client 204.

A base station 502 that performs wireless communication with the portable terminal 300 is connected to the relaying server 510 through a public line 504. When the portable terminal 300 establishes a link with the network 500, the relaying server 510 operates in place of the portable terminal 300 as a terminal on the network 500. The relaying server 510 transmits a request or data, which is received from the portable terminal 300 through the base station 502 and the public line 504, to a target terminal through the network 500. At the same time, the relaying server 510 transmits data from the target terminal on the network 500 to the portable terminal 300 through the public line 504 and the base station 200.

The portable terminal 300 includes a CPU, ROM, and RAM that are interconnected by a bus. Also, the portable terminal 300 includes an LCD (Liquid Crystal Display) that displays images and a key panel as a human interface, which can be used to input data using a plurality of keys.

The portable terminal 300 transmits and receives e-mail through a mail server (not shown). When a mail transmission request is received from the portable terminal 300, the e-mail server transmits the e-mail concerning the e-mail transmission request to a destination specified by a designated e-mail address. Also, the e-mail server receives and stores an e-mail transmitted from the outside (the database server 100 or the client 204) to the portable terminal 300. In response to a mail delivery request from the portable terminal 300, the e-mail server delivers the stored e-mail addressed to the portable terminal 300. It is also possible to attach usage certificate data (described hereinafter) to an e-mail, and hence e-mail with an attachment can be transmitted/received.

Figure 2:
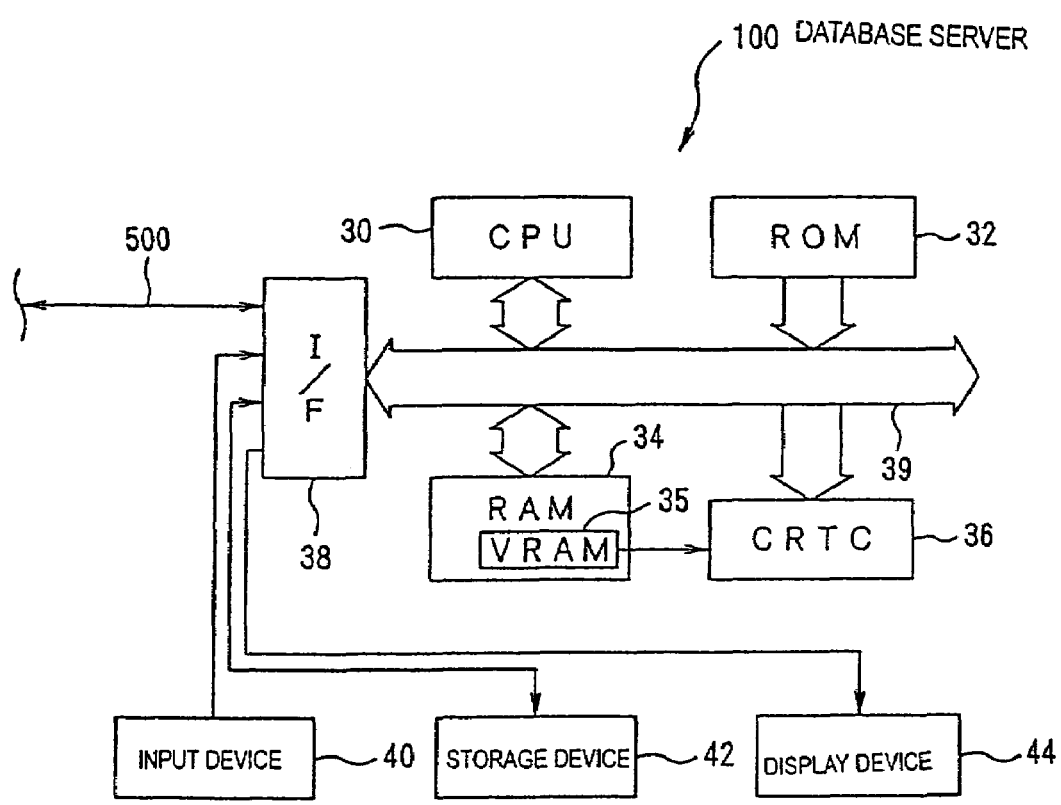
FIG. 2 is a schematic of the structure of a database server 100.

Referring to FIG. 2, the structure of the database server 100 will now be described in detail. FIG. 2 is a schematic of the structure of the database server 100.

As shown in FIG. 2, the database server 100 includes a CPU 30 that performs arithmetic operations and controls the overall system in accordance with a control program; a ROM 32 that stores in advance the control program for the CPU 30 or the like in a predetermined region; a RAM 34 that stores data read from the ROM 32 or the like and the results of the arithmetic operations which are required in the course of operation of the CPU 30; a CRTC 36 that converts data stored in a specific region of the RAM 34 into image signals and outputting the image signals to a display device 44; and an I/F 38 that carries data input and output with respect to external devices. These devices are interconnected by a bus 39, which is a signal line that transmits data, in which data can be communicated among these devices.

External devices are connected to the I/F 38. The external devices include an input device 40, which includes a keyboard, a mouse, and the like, that function as a human interface and input data; a storage device 42 that stores data and tables as files; the display device 44 that displays images based on image signals; and a signal line that establishes a connection with the network 500.

The RAM 34 includes a VRAM 35 as a specific region that stores display data to cause the display device 44 to display data. The VRAM 35 can be accessed independently by the CPU 30 and the CRTC 36.

The CRTC 36 sequentially reads the display data stored in the VRAM 35 at a predetermined cycle, starting from the first address. The CRTC 36 converts the read display data into image signals and outputs the image signals to the display device 44.

Figures 3, 4:
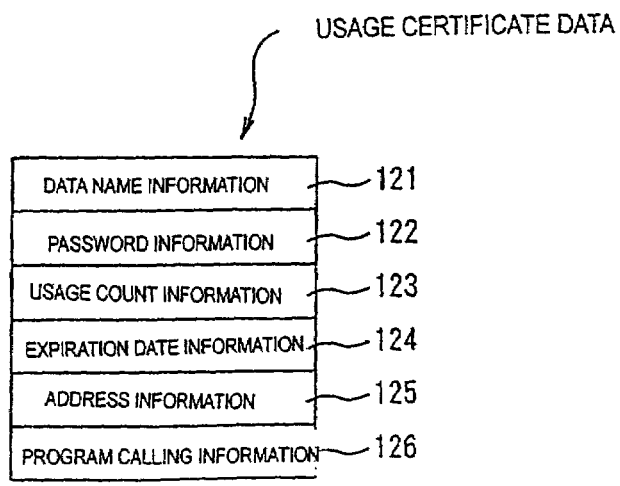
FIG. 3 illustrates the data structure of a usage certificate data registration table 110.
FIG. 4 illustrates the data structure of usage certificate data.

Referring to FIG. 3, the structure of data stored in the storage device 42 will now be described. FIG. 3 illustrates the data structure of a usage certificate data registration table 110.

As shown in FIG. 3, the storage device 42 stores the usage certificate data registration table 110 in which usage certificate data that uses receipt data is registered and a program (not shown) which is called based on program calling information included in the usage certificate data (described hereinafter).

In the usage certificate data registration table 110, as shown in FIG. 3, one record is registered for each piece of receipt data. Each record includes a field 112 that registers the data name of receipt data; a field 114 that registers a password that is required to use the receipt data; a field 116 that registers the usage count of the receipt data; and a field 118 that registers the expiration date for using receipt data. Also, the usage certificate data registration table 110 includes a field (not shown) that registers local information used to specify standard time based on which the expiration date is determined. The local information is, for example, JST (Japan Standard Time) when Japanese standard time is used.

In the example shown in FIG. 3, a first record from the top includes "receipt data 1" as the data name in the field 112, "xxxxabcd" as the password in the field 114, "1" as the usage count in the field 116, and "2000/3/31" as the expiration date in the field 118. The lowest record includes "receipt data n" as the data name in the field 112, "zzzzcdef" as the password in the field 114, "1" as the usage count in the field 116, and "2000/5/31" as the expiration date in the field 118.

In the initial state, no record is registered in the usage certificate data registration table 110. If necessary, the client 204 registers receipt data, and a corresponding record is added and is registered.

The CPU 30 includes a microprocessing unit MPU or the like. When receipt data is registered, as shown in FIG. 4, the CPU 30 issues usage certificate data to a buyer. FIG. 4 illustrates the data structure of usage certificate data.

As shown in FIG. 4, usage certificate data includes data name information 121 indicating the data name of receipt data; password information 122 indicating a password required that uses the receipt data; usage count information 123 indicating the usage count of the receipt data; expiration date information 124 indicating the expiration date of the receipt data; address information 125 indicating a network address that uniquely specifies the location of the database server 100 on the network 500; and program calling information 126 required to call a program that transmits a data usage request to the database server 100 based on the usage certificate data. Also, local information (not shown) that specifies standard time, based on which the expiration date is determined, is included.

The program calling information 126 includes a calling program that selectively calls a display program that displays the contents of usage certificate data or a usage request program that transmits a data usage request including the data name information 121 and the password information 122 to the database server 100 and requests the use of receipt data. In order to call the programs, the program calling information 126 also includes a network address (network address of the database server 100) that uniquely specifies the storage location to store these programs on the network 500. Both the display program and the usage request program are stored in the storage device 42 as programs that are called based on the program calling information 126.

Figure 5:
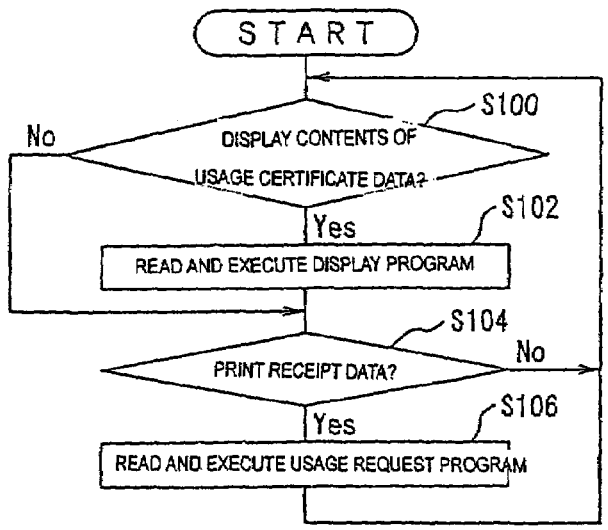
FIG. 5 is a flowchart showing a calling program.

Referring to FIG. 5, the calling program included in the program calling information 126 will now be described in detail. FIG. 5 is a flowchart showing the calling program.

The calling program is a multi-platform program that includes a group of commands (for example, JAVA applets) which are independent of the type of CPU. When the calling program is executed by a terminal on the network 500, as shown in FIG. 5, the calling program proceeds to step S100.

In step S100, the calling program determines whether or not a request to display the contents of usage certificate data is input. If it is determined that the request to display the contents of usage certificate data is input (Yes), in step S102, the calling program refers to a network address included in the program calling information 126, and the calling program reads and executes the display program from the database server 100. Then, the calling program proceeds to step S104.

In step S104, the calling program determines whether or not a request to print the receipt data is input. If it is determined that the request to print the receipt data is input (Yes), step S106 is then performed in which the calling program refers to the network address included in the program calling information 126, and the calling program reads and executes the usage request program from the database server 100. Then, the calling program proceeds to step S100.

In contrast, if it is determined in step S100 that no request to display the contents of usage certificate data is input (No), the calling program proceeds to step S104.

In contrast, if it is determined in step S104 that no request to display the receipt data is input (No), the program proceeds to step S100.

Figure 6:
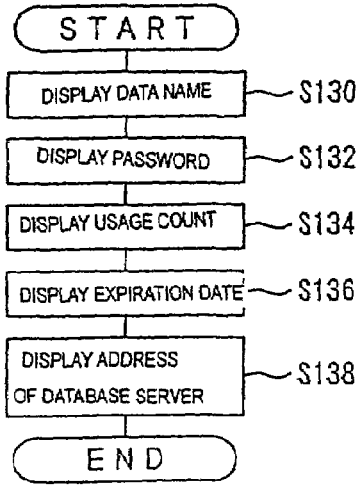
FIG. 6 is a flowchart showing a display program.

Referring to FIG. 6, the display program in the storage device 42 will now be described in detail. FIG. 6 is a flowchart showing the display program.

As in the calling program, the display program is a multi-platform program formed of a group of commands that are independent of the type of CPU. The display program is read by executing the calling program. When the display program is executed by a terminal on the network 500, as shown in FIG. 6, the display program proceeds to step S130.

In step S130, the display program displays the data name of receipt data based on the data name information 121 included in the usage certificate data. In step S132, the display program displays a password based on the password information 122 included in the usage certificate data. In step S134, the display program displays the remaining usage count of the receipt data based on the usage count information 123 included in the usage certificate data. Subsequently, the display program proceeds to step S136.

In step S136, the display program displays the expiration date of the receipt data based on the expiration date information 124 included in the usage certificate data. In step S138, the display program displays a network address of the database server 100 based on the address information 125 included in the usage certificate data. The display program is then terminated.

Figure 7:
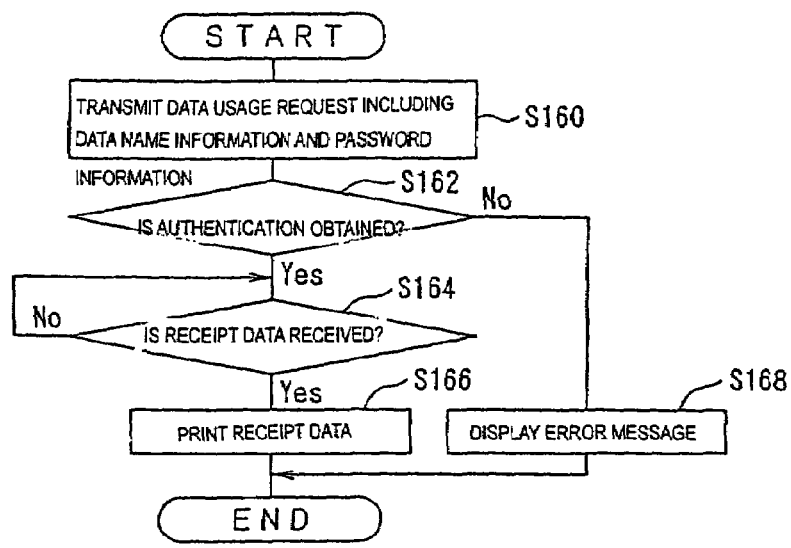
FIG. 7 is a flowchart showing a usage request program.

Referring to FIG. 7, the usage request program in the storage device 42 will now be described in detail. FIG. 7 is a flowchart showing the usage request program.

As in the calling program, the usage request program is a multi-platform program formed of a group of commands that are independent of the type of CPU. The usage request program is read by executing the calling program. When the usage request program is executed by a terminal on the network 500, as shown in FIG. 7, the usage request program proceeds to step S160.

In step S160, the usage request program refers to a network address based on the address information 125 included in the usage certificate data and transmits a data usage request including the data name information 121 and the password information 122 included in the usage certificate data to the database server 100. In step S162, the usage request program determines whether or not authentication from the database server 100 is received. If it is determined that authentication is received (Yes), the usage request program proceeds to step S164.

In step S164, the usage request program determines whether or not receipt data is received. If it is determined that receipt data is received (Yes), the usage request program proceeds to step S166. If it is determined to the contrary (No), the usage request program is queued in step S164 until the receipt data is received.

In step S166, the usage request program prints the received receipt data, and the usage request program is then terminated.

In contrast, if it is determined in step S162 that no authentication from the database server 100 is received (No), the usage request program proceeds to step S168 and displays an error message. Subsequently, the usage request program is terminated.

Referring back to FIG. 2, the CPU 30 activates a predetermined program stored in a predetermined region of the ROM 32. In accordance with the program, a registration process and a providing process shown in FIGS. 8 and 9, respectively, are executed.

Figure 8:
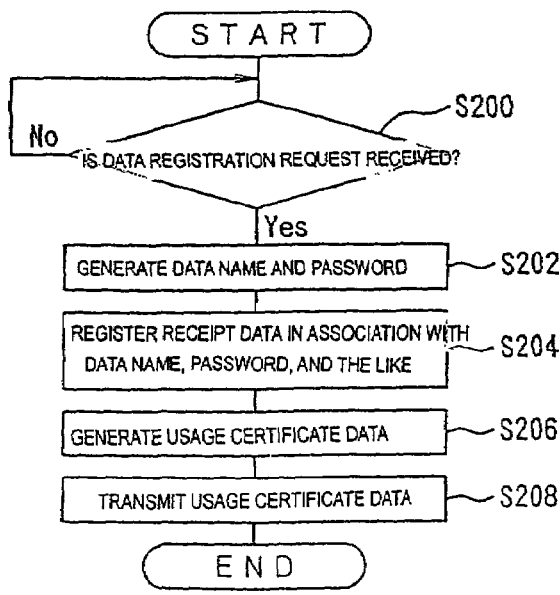
FIG. 8 is a flowchart showing a registration process.

Referring to FIG. 8, the registration process is described in detail. FIG. 8 is a flowchart showing the registration process.

The registration process is a process that registers receipt data. When the registration process is executed by the CPU 30, as shown in FIG. 8, the registration process proceeds to step S200. The registration process corresponds to a registration request process executed by the client 204, which will be described hereinafter.

In step S200, it is determined whether or not a data registration request is received. If it is determined that the data registration request is received (Yes), the registration process proceeds to step S202. If it is determined to the contrary (No), the registration process is queued in step S200 until it receives a data registration request.

In step S202, the registration process generates a data name and password for receipt data included in the received data registration request. In step S204, the registration process registers the receipt data included in the received data registration request in the usage certificate data registration table 110 in association with the generated data name, password, usage count, and expiration date. Then, the registration process proceeds to step S206.

In step S206, the registration process generates usage certificate data shown in FIG. 4. In step S208, the registration process transmits the generated usage certificate data to the sender of the data registration request. The registration process is then terminated.

Figure 9:
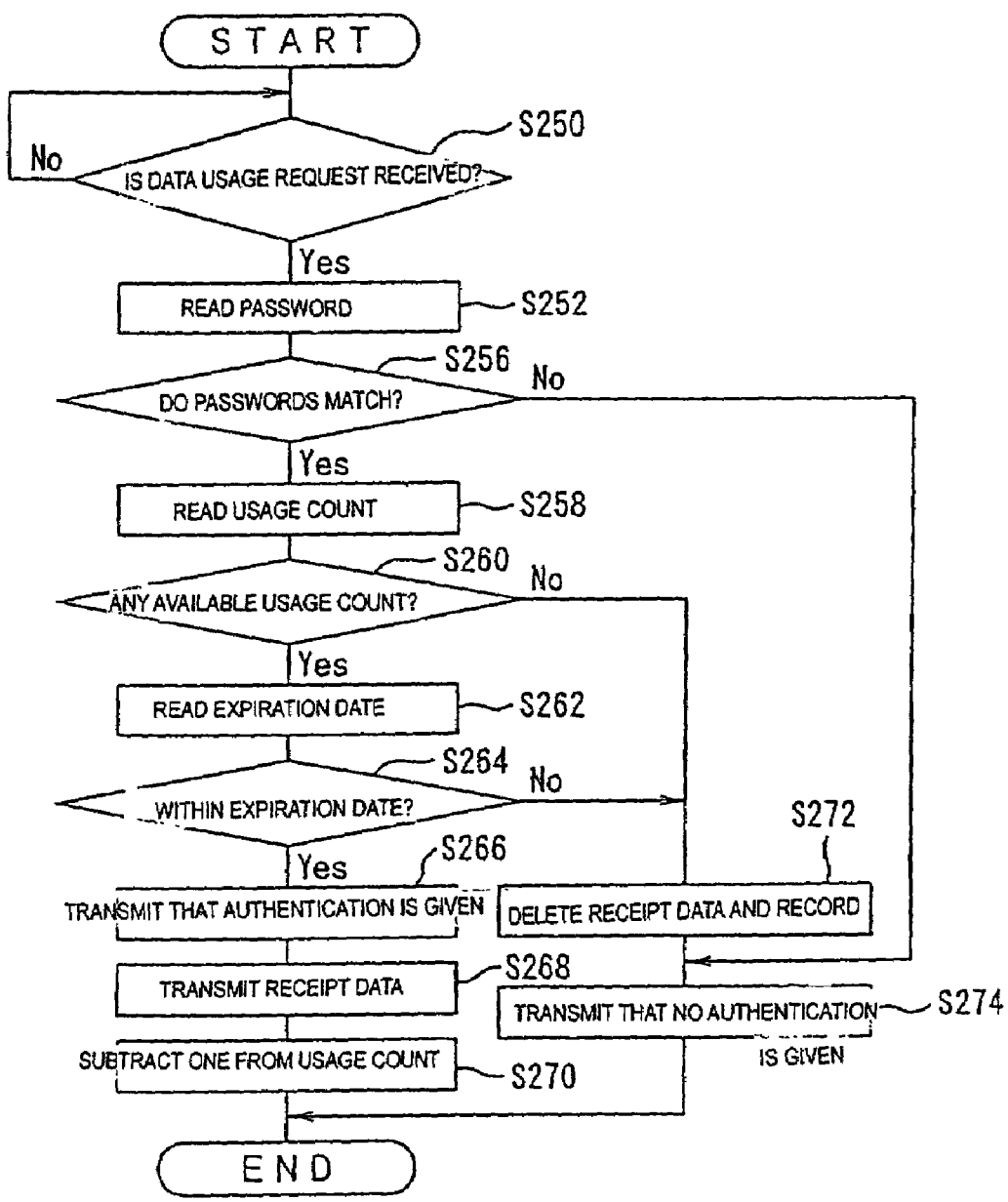
FIG. 9 is a flowchart showing a providing process.

Referring to FIG. 9, the providing process will now be described in detail. FIG. 9 is a flowchart showing the providing process.

The providing process is a process that provides receipt data. When the providing process is executed by the CPU 30, as shown in FIG. 9, the providing process proceeds to step S250. The providing process corresponds to the usage request program executed by a terminal on the network 500.

In step S250, the providing process determines whether or not a data usage request is received. If it is determined that a data usage request is received (Yes), the providing process proceeds to step S252. If it is determined to the contrary (No), the providing process is stopped in step S250 until it receives a data usage request.

In step S252, the providing process reads a password from a record in which the same data name as that included in the received data usage request is registered from among records in the usage certificate data registration table 110. In step S256, the providing process determines whether or not the read password matches a password included in the received data usage request. If it is determined that the two passwords match (Yes), the providing process proceeds to step S258.

In step S258, the providing process reads a usage count from the record in which the same data name as that included in the data name usage request is registered from among records in the usage certificate data registration table 110. In step S260, the providing process determines whether or not there is a remaining usage count. If it is determined that there is a remaining usage count (Yes), the providing process proceeds to step S262.

In step S262, the providing process reads an expiration date from the record in which the same data name as that included in the received data usage request is registered from among records in the usage certificate data registration table 110. In step S264, the providing process determines whether or not it is within the expiration date. If it is determined that it is within the expiration date (Yes), the providing process proceeds to step S266.

In step S266, the providing process transmits the fact that authentication by the database server 100 has been made to the sender of the data usage request. In step S268, the providing process reads receipt the data from the storage device 42 which is specified by the data name included in the received data usage request, and the providing process transmits the read receipt data to the sender of the data usage request. In step S270, the providing process subtracts one from the usage count of the record in which the same data name as that included in the received data usage request is registered from among records in the usage certificate data registration table 110. The providing process is then terminated.

In contrast, if it is determined in step S264 that it is not within the expiration date (No), in step S272, the providing process deletes from the storage medium 42 the receipt data specified by the data name included in the received data usage request. At the same time, the providing process deletes, from the usage certificate data registration table 110, the record in which the same data name as that included in the received data usage request is registered. In step S274, the providing process transmits the fact that no authentication has not been made by the database server 100 to the sender of the data usage request. Then, the providing process is terminated.

In contrast, if it is determined in step S260 that no usage count is detected (No), the providing process proceeds to step S272.

In contrast, if it is determined in step 256 that the two passwords do not match (No), the providing process proceeds to step S274.

Figure 10:
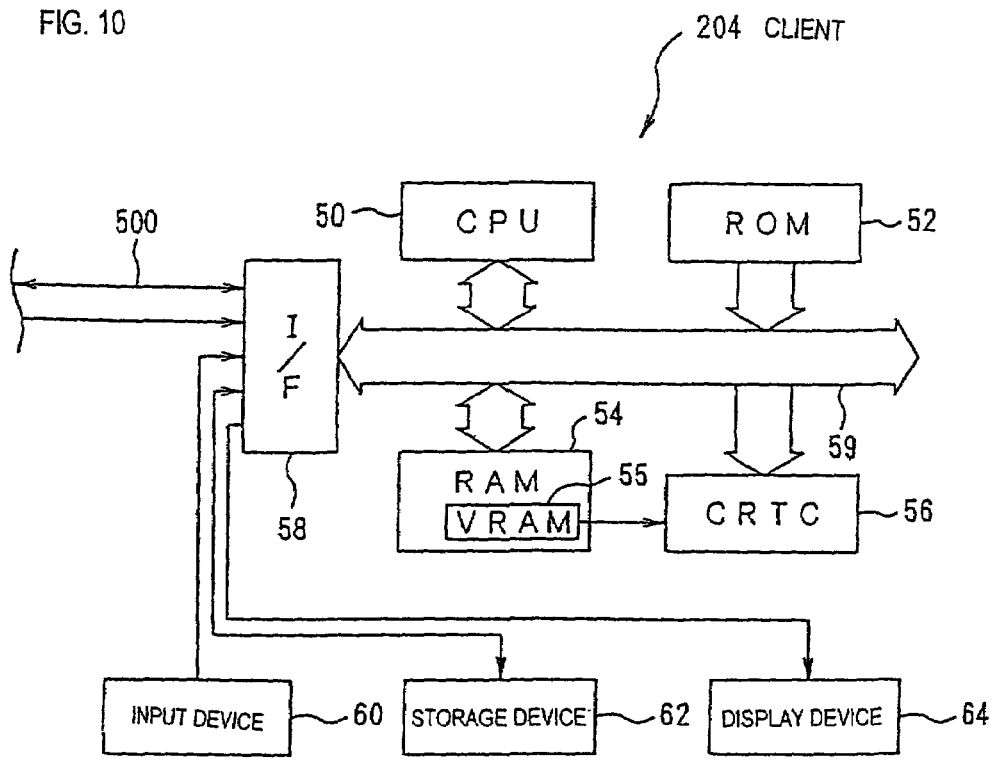
FIG. 10 is a schematic of the structure of a client 204.

Referring to FIG. 10, the structure of the client 204 will now be described in detail. FIG. 10 is a schematic of the structure of the client 204.

As shown in FIG. 10, the client 204 includes a CPU 50 that performs arithmetic operations and controls the overall system in accordance with a control program; a ROM 52 that stores in advance the control program for the CPU 50 or the like in a predetermined region; a RAM 54 that stores data read from the ROM 52 or the like and the results of the arithmetic operations which are required in the course of operation of the CPU 50; a CRTC 56 that converts data stored in a specific region of the RAM 54 into image signals and outputs the image signals to a display device 64; and an I/F 58 that carries data input and output with respect to external devices. These devices are interconnected by a bus 59, which is a signal line that transmits data, in which data can be communicated among these devices.

The following external devices are connected to the I/F 58. Concerning the external devices, there are an input device 60, which includes a keyboard, a mouse, and the like, that function as a human interface and inputting data; a storage device 62 that stores data and tables as files; the display device 64 that displays images based on image signals; a signal line that establishes a connection with the network 500; and a signal line that establishes a connection with the POS terminal 202.

Figure 11:
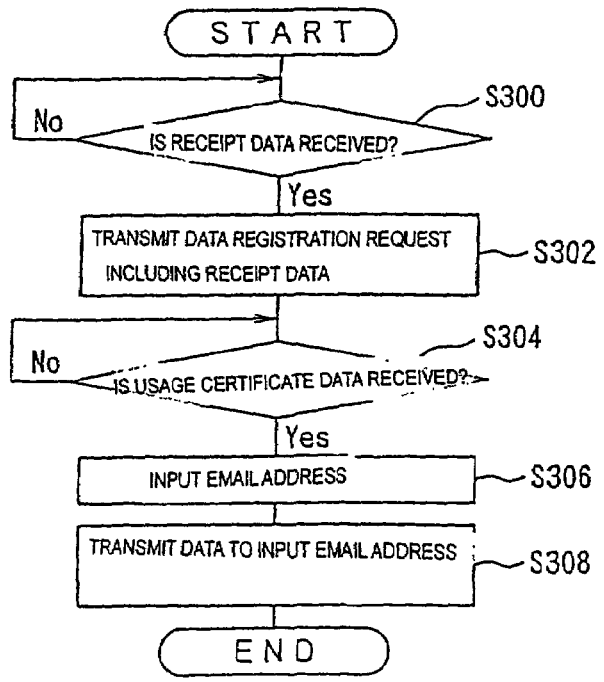
FIG. 11 is a flowchart showing a registration process.

The CPU 50 includes a microprocessing unit MPU or the like. The CPU 50 activates a predetermined program stored in a predetermined region of the ROM 52. In accordance with the program, a registration request process shown in a flowchart in FIG. 11 is executed. FIG. 11 is the flowchart showing the registration process.

The registration request process is a process that requests that receipt data be registered. When the registration request process is executed by the CPU 50, as shown in FIG. 11, the registration request process proceeds to step S300.

In step S300, the registration request process determines whether or not receipt data from the POS terminal 202 is received. If it is determined that receipt data is received (Yes), the registration request process proceeds to step S302. If it is determined to the contrary (No), the registration request process is stopped in step S300 until it receives receipt data.

In step S302, the registration request process transmits a data registration request including the receipt data to the database server 100. In step S304, the registration request process determines whether or not usage certificate data is received. If it is determined that usage certificate data is received (Yes), the registration request process proceeds to step S306. If it is determined to the contrary (No), the registration request process is stopped in step S304 until it receives usage certificate data.

In step S306, an e-mail address is input. In step S308, the registration request process transmits the usage certificate data in the form of an e-mail to the destination specified by the input e-mail address. The registration request process is then terminated.

The operation of the above-described embodiment will now be described.

First, a case in which receipt data is registered in the database server 100 is described.

When a buyer purchases an item at the store 200, the POS terminal 202 generates receipt data, which is a detailed statement of the item, and the receipt data is transmitted to the client 204. When the client 204 receives the receipt data, in step S302, a data registration request including the received receipt data is transmitted to the database server 100.

When the database server 100 receives the data registration request, in steps S202 and S204, the data name and password for the receipt data included in the received data registration request are generated. The receipt data included in the received data registration request is registered in the usage certificate data registration table 110 in association with the generated data name, password, usage count, and expiration date. In steps S206 and S208, usage certificate data shown in FIG. 4 is generated, and the generated usage certificate data is transmitted to the client 204.

The usage count of the receipt data is set to one because it is not very desirable that certificate information, such as receipt data, be printed a number of times, which may lead to falsification of data or the like. The usage count can be set by the store 200. Alternatively, the usage count can be set by determining, by the database server 100, the type of data concerning the data registration request.

When the client 204 receives the usage certificate data, the input device 60 inputs the e-mail address of the portable terminal 300 owned by the buyer. In step S308, the received usage certificate data is transmitted to the portable terminal 300. Accordingly, the buyer receives the transmitted usage certificate data.

In this manner, when the buyer purchases an item at the store 200, receipt data, which is a detailed statement of the item, is registered in the database server 100. At the same time, usage certificate data that uses the receipt data is transmitted to the buyer's portable terminal 300.

When the buyer wants to view the contents of the usage certificate data, for example, the buyer clicks an icon of the usage certificate data or the like. As a result, the portable terminal 300 refers to the program calling information 126 of the usage certificate data, and the calling program is executed. At this time, the buyer enters a request to display the contents of the usage certificate data using the key panel. In response to this, the calling program refers to the address information 125 of the usage certificate data. Then, the display program is read from the database server 100 and is executed. In steps S130 to S138, the display program displays the contents of the usage certificate data on the LCD. Specifically, the data name, password, usage count, expiration date of the receipt data and the network address of the database server 100 are displayed.

A case in which the receipt data registered in the database server 100 is printed will now be described.

When a buyer purchases an item and subsequently wants to print receipt data using the nearest print server 400, the buyer transmits the usage certificate data in the portable terminal 300 to the print server 400.

When the print server 400 receives the usage certificate data, the print server 400 refers to the program calling information 126 of the received usage certificate data, and the calling program is executed. The calling program refers to the address information 125 of the received usage certificate data, the usage request program is read from the database server 100, and the read usage request program is executed. In step S160, the usage request program obtains the data name information 121 and the password information 122 from the received usage certificate data, and the usage request program refers to the address information 125 of the received usage certificate data. A data usage request including the obtained information is transmitted to the database server 100.

When the database server 100 receives the data usage request, in step S252, the database server 100 reads, from among records of the usage certificate data registration table 110, a password from the record in which the same data name as that included in the received data usage request is registered. It is then determined whether or not the password included in the received data usage request matches the read password. Since the buyer has requested to use the receipt data based on the authentically issued usage certificate data, it is determined that the password included in the received data usage request and the read password match.

In steps S256 and S258, the usage count is read from the record in which the same data name as that included in the received data usage request is registered, from among records of the usage certificate data registration table 110. Next, it is determined whether or not there is an available usage count. In this example, the buyer has never printed the receipt data. Thus, it is determined that there is an available usage count.

In steps S260 and S262, the expiration date is read from the record in which the same data name as that included in the received data usage request is registered, from among records of the usage certificate data registration table 110. Next, it is determined whether or not it is within the expiration date. If it is determined that use of the receipt data is within the expiration date, in steps S264 to S268, authentication by the database server 100 is transmitted to the print server 400. The receipt data specified by the data name included in the received data usage request is read from the storage device 42, and the read receipt data is transmitted to the print server 400.

When the print server 400 receives the receipt data, in step S166, the received receipt data is printed. Accordingly, the buyer receives the printed receipt data.

By storing the usage certificate data, instead of the receipt data itself, in the buyer's portable terminal 300, the buyer can print the receipt data at any place if necessary.

If the password included in the received data usage request and the read password do not match, if there is no usage count available, or if it is not within the expiration date, in step S274, the database server 100 transmits the fact that no authentication has been made by the database server 100 to the print server 400.

When no authentication is made by the database server 100, the print server 400 displays an error message in step S168. Concerning the error message, it is not only possible for the print server 400 to display the error message, but also to transmit the error message to the portable terminal 300. Hence, the portable terminal 300 can also display the error message.

According to this embodiment, when the database server 100 receives a data registration request, the database server 100 registers receipt data included in the received data registration request in association with the data name information 121, the password information 122, and the like. At the same time, the database server 100 is designed to transmit usage certificate data which includes the information 121 and 122. When the database server 100 receives a data usage request, and when the password of the record in which the same data name as that included in the received data usage request is registered matches the password included in the received data usage request, the database server 100 is designed to transmit receipt data specified by the data name included in the received data usage request to the print server 400.

By storing the usage certificate data, in place of the receipt data itself, in the portable terminal 300, the buyer can print the receipt data at any location, if necessary. Thus, it is possible to use the receipt data without occupying a large portion of the data capacity of the portable terminal 300.

According to this embodiment, the database server 100 registers the receipt data included in the received data registration request in association with the usage count information 123. When the record in which the same data name as that included in the received data usage request is registered has an available usage count, the database server 100 transmits the receipt data specified by the data name included in the received data usage request to the print server 400. If the record has no usage count available, transmission of the receipt data is prohibited.

Accordingly, the store 200 can restrict the number of times the buyer uses the receipt data. Since the receipt data is directly transmitted to the print server 400, it becomes difficult for the buyer to freely duplicate the receipt data. As a result, the possibility of certificate information such as the receipt data being duplicated a large number of times or being falsified can be reduced.

According to this embodiment, the usage certificate data includes a network address that uniquely specifies the location of the database server 100 on the network 500.

By referring to the network address included in the usage certificate data, the print server 400 can transmit a data usage request to the database server 100. Therefore, the convenience of using the receipt data is enhanced.

According to this embodiment, the usage certificate data includes a network address that uniquely specifies, on the network 500, the location at which the usage request program that transmits the data usage request to the database server 100 is stored.

By referring to the network address included in the usage certificate data, the print server 400 can read the usage request program from the database server 100 and transmits, using the usage request program, the data usage request to the database server 100. As a result, it becomes even more convenient to use the receipt data.

According to this embodiment, the usage certificate data includes the usage count of the receipt data.

Thus, the buyer can determine, from the portable terminal 300, the number of times the receipt data can be printed. It thus becomes more convenient to use the receipt data.

According to this embodiment, the receipt data included in the received data registration request is registered in association with the expiration date information 124. If it is within the expiration date of the record in which the same data name as that included in the received data usage request is registered, the receipt data specified by the data name included in the received data usage request is transmitted to the print server 400. If it is not within the expiration date, transmission of the receipt data is prohibited.

Thus, the store 200 can impose a time limit on using, by the buyer, the receipt data.

According to this embodiment, the usage certificate data includes the expiration date of the receipt data.

Thus, the buyer can determine, from the portable terminal 300, the period in which the receipt data can be printed. It thus becomes more convenient to use the receipt data.

According to this embodiment, the usage certificate data includes the program calling information 126 which is necessary to call a program for transmitting a data usage request to the database server 100 based on the usage certificate data. Based on the program calling information 126, the multi-platform display program or the multi-platform usage request program is read from the database server 100 and is executed.

By clicking the icon of the usage certificate data or the like, the contents of the usage certificate data are displayed or the receipt data is printed. It thus becomes more convenient to use the receipt data.

According to this embodiment, the receipt data corresponds to print data. The data name information 121 and the password information correspond to authentication information. The storage device 42 corresponds to the storage device. The print server 400 corresponds to a print terminal. Steps S200 to S208 correspond to the registration device. Steps S250 to S274 correspond to the providing device.

According to this embodiment, the database server 100 is designed to transmit usage certificate data to the sender of a data registration request. However, the present invention is not limited to this embodiment. When a network address is included in a data registration request, the usage certificate data is transmitted to the destination specified by the network address. When no network address is included in a data registration request, the usage certificate data is transmitted to the sender of the data registration request.

When the client 204 transmits a data registration request including a network address, such as the e-mail address of the buyer to the database server 100, the usage certificate data can be transmitted to the portable terminal 300 without passing through the client 204. Compared with a case in which the usage certificate data is transmitted via the client 204 to the portable terminal 300, the client 204 is relieved of the burden of retransmitting the usage certificate data to the portable terminal 300. It is also possible to reduce the possibility of the usage certificate data being transmitted to another terminal by mistake. Furthermore, the possibility of the usage certificate data being obtained by a third party during transmission is reduced.

According to this embodiment, the database server 100 is designed to transmit receipt data to the sender of a data usage request. However, the present invention is not limited to this embodiment. When a network address is included in a data usage request, the receipt data is transmitted to the destination specified by the network address. When no network address is included in a data usage request, the receipt data is transmitted to the sender of the data usage request.

In this way, when the portable terminal 300 transmits a data usage request which includes the network address of the print server 400, the receipt data is transmitted to the print server 400. Thus, the portable terminal 300 is not required to transmit the usage certificate data to the print server 400. It is thus possible not only to eliminate the burden of transmitting the usage certificate data to the print server 400, but also to reduce the possibility of the usage certificate data being obtained by a third party during transmission.

According to this embodiment, the receipt data is restricted by the usage count, and hence the receipt data can be printed within the range of the preset usage count. However, the present invention is not limited to this embodiment. Instead of restricting the receipt data using the usage count, it is possible to print the receipt data any number of times. Alternatively, instead of restricting the entire receipt data using the usage count, it is possible to restrict part of the receipt data by the usage count. For example, from among the receipt data, certificate information that certifies that particular information is issued by the store 200 is restricted by the usage count. From among the receipt data, information concerning the product code, name, and price of an item is not restricted by the usage count.

According to this embodiment, the present invention is applied to a case in which the receipt data is printed. However, the present invention is not limited to this embodiment. It is also possible to apply the present invention to cases of printing various print data such as: a resident card, a copy of a family register, a medical certificate, and other types of certificates; a railway ticket, an admission ticket, and other types of securities; a photograph of a celebrity, a photograph of a famous landscape or building, and other types of photographs; and a drawing, book, or other types of literary works by another person. In these cases, it is assumed that numerous free duplications of such print data by a user will cause inconvenience. Thus, the significance of restricting the usage count as in the present invention is very profound.

According to this embodiment, a case in which the display program and the usage request program shown in the flowcharts in FIGS. 6 and 7 are stored in the database server 100 has been described. However, the present invention is not limited to this embodiment. It is also possible to store the programs in another terminal on the network 500.

According to this embodiment, a case has been described in which, when executing the display program and the usage request program shown in the flowcharts in FIGS. 6 and 7, the programs are read from the database server 100 and are executed. However, the present invention is not limited to this embodiment. It is also possible to store the programs beforehand in the main storage device of a terminal, such as a ROM or in an auxiliary storage device such as an HD, and the programs can be read into a RAM or the like and be executed.

According to this embodiment, when performing the registration process and the providing process shown in the flowcharts in FIGS. 8 and 9, a case has been described in which the control program which is stored beforehand in the ROM 32 is executed. However, the present invention is not limited to this embodiment. It is also possible to read a program that performs the processes which is stored in a storage medium into the RAM 34 and to execute the program.

According to this embodiment, when performing the registration request process shown in the flowchart in FIG. 11, a case has been described in which the control program which is stored beforehand in the ROM 52 is executed. However, the present invention is not limited to this embodiment. It is also possible to read a program that performs the process which is stored in a storage medium into the RAM 54 and to execute the program.

The storage medium includes a semiconductor storage medium, such as a RAM, ROM, or the like, a magnetic storage medium such as an FD, HD, or the like, an optically-read storage medium, such as a CD, CDV, LD, DVD, or the like, or a magnetic/optically-read storage medium, such as an MO or the like. Regardless of the reading method such as electronic, magnetic, or optical reading, the storage medium includes any type as long as it is a computer-readable storage medium.

According to this embodiment, a print data management apparatus, a storage medium having stored therein a print data management program, a storage medium having stored therein usage certificate data, and a method of using print data according to the present invention have been applied to a case in which, as shown in FIG. 1, when the buyer purchases an item at the store 200, receipt data which is a detailed statement of the item is registered in the database server 100, usage certificate data is issued in place of the receipt data to the buyer, and the buyer can subsequently use the usage certificate data to print the receipt data. However, the present invention is not limited to this embodiment. The present invention is applicable to other cases included within the scope of the present invention.

As described above, according to the print data management apparatus of the present invention, a user can print print data at any place necessary by storing usage certificate data, instead of the print data itself, in the user's terminal. Thus, it is possible to use the print data without occupying a large portion of the data capacity of the terminal.

Furthermore, according to the print data management apparatus of the present invention, a provider can restrict the number of times a user can use print data. Since the print data is directly transmitted to a print terminal, it is difficult for the user to freely duplicate the print data. The present invention is therefore advantageous when it is applied to reducing the possibility of print data which has the property of a certificate or the like from being duplicated a large number of times or being falsified.

Furthermore, according to the print data management apparatus of the present invention, a terminal which has usage certificate data refers to a network address included in the usage certificate data, thus transmitting a data usage request to the print data management apparatus. Accordingly, the convenience of using the print data is further enhanced.

Furthermore, according to the print data management apparatus of the present invention, a terminal which has usage certificate data refers to a network address included in the usage certificate data, thus reading a program from within the network. Using the program, the terminal can transmit a data usage request to the print data management apparatus. It is thus possible to further enhance the convenience of using print data.

Moreover, according to the print data management apparatus of the present invention, a terminal which is to register print data transmits a data registration request including the network address of a user's terminal to the print data management apparatus. As a result, not only the burden of retransmitting usage certificate data to the user's terminal is lessened, but also the possibility of usage certificate data being transmitted to another terminal by mistake is reduced. It is also possible to reduce the possibility of the usage certificate data being obtained by a third party during transmission.

Furthermore, according to the print data management apparatus of the present invention, by transmitting a data usage request including the network address of a print terminal, a user's terminal is not required to transmit usage certificate data to the print terminal. Thus, not only the burden of transmitting the usage certificate data to the print terminal is lessened, but also the possibility of the usage certificate data being obtained by a third party during transmission is reduced.

According to the storage medium having stored therein the print data management program of the present invention, advantages equivalent to those of the print data management apparatus can be obtained.

According to the storage medium having stored therein usage certificate data of the present invention, advantages equivalent to those of the print data management apparatus can be obtained.

According to the method of using print data of the present invention, a user can print data at any place if necessary by storing usage certificate data, in place of the print data itself, in a user's terminal. It is thus possible to use the print data without occupying a large amount of the data capacity of the terminal.

According to the print data using method of the present invention, a provider can restrict the number of times a user can use print data. Since print data is directly transmitted to a print terminal, it is difficult for the user to freely duplicate the print data. It is therefore possible to reduce the possibility of print data which has the property of a certificate or the like being duplicated a large number of times or being falsified.

What is claimed is:

1. A print data management apparatus for registering, in response to a data registration request which includes print data, the print data and for providing, in response to a data usage request, the print data relating to the data usage request, comprising:
   a storage device that performs registration of the print data;
   a registration device that registers the print data in said storage device; and
   a providing device that provides the print data in said storage device;
   such that, when the data registration request is received, said registration device registers the print data included in the received data registration request in said storage device, in association with authentication information for authenticating whether or not a user is eligible to use the print data, and said registration device transmits to a terminal designated by the data registration request, usage certificate data which includes the authentication information; and
   when the data usage request which includes the authentication information is received, and when the authentication information in said storage device that corresponds to the print data relating to the received data usage request and the authentication information included in the received data usage request satisfy a predetermined relationship, said providing device transmits to a terminal designated by the data usage request the print data in said storage device relating to the received data usage request.

2. The print data management apparatus according to claim 1,
   said registration device registering the print data included in the received data registration request in said storage device, in association with usage count information which indicates the number of times the print data is permitted to be used; and
   when a usage count in the usage count information in said storage device which corresponds to the print data relating to the received data usage request is greater than or equal to a predetermined number, said providing device transmitting the print data in said storage device relating to the received data usage request to a print terminal, and, when the usage count in the usage count information is less than the predetermined number, transmission of the print data is prohibited.

3. The print data management apparatus according to claim 1,
   the usage certificate data further including a network address that uniquely specifies the location of the apparatus on a network to which the apparatus is connected.

4. The print data management apparatus according to claim 1,
   the usage certificate data further including a network address that uniquely specifies, on a network, the storage location of a program that transmits the data usage request which includes the authentication information to the apparatus, the program being stored in the network.

5. The print data management apparatus according to claim 1,
   when a network address is included in the data registration request, said registration device transmitting the usage certificate data to a destination specified by the network address, and, when no network address is included in the data registration request, said registration device transmitting the usage certificate data to the sender of the data registration request.

6. The print data management apparatus according to claim 1,
   when a network address is included in the data usage request, said providing device transmitting the print data to a destination specified by the network address, and, when no network address is included in the data usage request, said providing device transmitting the print data to the sender of the data usage request.

7. A computer-readable storage medium having stored therein a print data management program to be applied to the print data management apparatus as set forth in claim 1, comprising:
   a program for causing a computer to perform processing implemented by the registration device that registers print data in the storage device and processing implemented by the providing device that provides the print data in said storage device;
   such that, when a data registration request is received, said registration device registers the print data included in the received data registration request in said storage device, in association with authentication information that authenticates whether or not a user is eligible to use the print data, and said registration device transmits to the terminal designated by the data registration request usage certificate data which includes the authentication information; and
   when a data usage request which includes the authentication information is received, and when the authentication information in said storage device which corresponds to the print data relating to the received data usage request and the authentication information included in the received data usage request satisfy a predetermined relationship, said providing device transmits to the terminal designated by the data usage request the print data in said storage device relating to the received data usage request.

8. A computer-readable storage medium having stored therein usage certificate data to be transmitted by the print data management apparatus as set forth in claim 1, comprising:
   a program for storing authentication information that authenticates, by said print data management apparatus, whether or not a user is eligible to use the print data and a network address that uniquely specifies, on a network, the storage location of a program for transmitting a data usage request that includes the authentication information to said print data management apparatus, the program being stored in the network.

9. A method of using print data by a computer system, comprising:
providing print data with a provider, including: registering the print data in a storage device in association with authentication information that authenticates whether or not a user is eligible to use the print data; and transmitting to a terminal designated by the data registration request usage certificate information that includes the authentication information to the user of the print data;
with a user, receiving the usage certificate data; and transmitting a data usage request which includes the authentication information; and
the providing further including receiving the data usage request; and transmitting to a terminal designated by the data usage request the print data in said storage device relating to the received data usage request when the authentication information in said storage device that corresponds to the print data relating to the received data usage request and the authentication information included in the received data usage request satisfy a predetermined relationship.

10. The method of using print data according to claim 9, the providing step further including registering the print data in said storage device in association with usage count information that indicates the number of times the print data is permitted to be used; and transmitting, when a usage count in the usage count information in said storage device that corresponds to the print data relating to the received data usage request is greater than or equal to a predetermined number, the print data in said storage device that corresponds to the received data usage request to a print terminal, and prohibiting transmission of the print data when the usage count in said usage count information is less than the predetermined number.

11. The print data management apparatus according to claim 1, when the terminal is not designated by at least one of the data registration request and the data usage request, the usage certificate data and print data being transmitted to transmission origin of the data registration request and the data usage request.

12. The computer-readable storage medium according to claim 7, when the terminal is not designated by at least one of the data registration request and the data usage request, the usage certificate data and print data being transmitted to transmission origin of the data registration request and the data usage request.

13. The method for using print data according to claim 9, the transmitting further including, when the terminal is not designated by at least one of the data registration request and the data usage request, transmitting to transmission origin of the data registration request and the data usage request.

* * * * *